UNITED STATES PATENT OFFICE.

PLACIDE HEBERT, OF NEW IBERIA, LOUISIANA.

BITTERS.

SPECIFICATION forming part of Letters Patent No. 443,236, dated December 23, 1890.

Application filed October 23, 1890. Serial No. 369,092. (No specimens.)

*To all whom it may concern:*

Be it known that I, PLACIDE HEBERT, a citizen of the United States, residing at New Iberia, in the parish of Iberia and State of Louisiana, have invented certain new and useful Improvements in Bitters; and I do declare the following to be a full, clear, and exact description of the invention, such as will enable others skilled in the art to which it appertains to make and use the same.

My invention has for its object to provide an efficacious remedy for the cure of chills and fever, liver, kidney, and spleen complaints, and whites in women; and it consists of the following ingredients, combined in the proportions stated, viz: Holland gin, one gallon; cherry-root, four ounces; cherry-bark, four ounces; cormier-bark, (service-tree bark,) one pound.

In preparing my composition I first ignite the gin and allow the same to burn out, after which the other ingredients, which have been reduced to a powder, are added and the whole thoroughly mingled by agitation. The composition is then allowed to stand exposed to the atmosphere for about one month, after which it is strained and bottled, and is then ready for use.

The remedy is adapted to be administered internally and is given in doses of one teaspoonful three times a day before meals.

Having described my invention, what I claim is—

The herein-described composition of matter, consisting of Holland gin, cherry-root, cherry-bark, and cormier-bark, in the proportions specified.

In testimony whereof I affix my signature in presence of two witnesses.

PLACIDE HEBERT.

Witnesses:
 A. E. DECUIR,
 ALF. RENOUDET.